(12) United States Patent
Molin et al.

(10) Patent No.: US 9,081,399 B2
(45) Date of Patent: Jul. 14, 2015

(54) CHARGE PUMP REGULATOR CIRCUIT WITH VARIABLE AMPLITUDE CONTROL

(71) Applicant: Silanna Semiconductor U.S.A., Inc., San Diego, CA (US)

(72) Inventors: Stuart B. Molin, Carlsbad, CA (US); Perry Lou, Carlsbad, CA (US); Clint Kemerling, Escondido, CA (US)

(73) Assignee: Silanna Semiconductor U.S.A., Inc., San Diego, CA (US)

( * ) Notice: Subject to any disclaimer, the term of this patent is extended or adjusted under 35 U.S.C. 154(b) by 0 days.

(21) Appl. No.: 13/937,201

(22) Filed: Jul. 8, 2013

(65) Prior Publication Data

US 2014/0009136 A1     Jan. 9, 2014

Related U.S. Application Data

(63) Continuation-in-part of application No. 13/544,815, filed on Jul. 9, 2012.

(51) Int. Cl.
    *G05F 1/10*  (2006.01)
    *H02M 3/07*  (2006.01)

(52) U.S. Cl.
    CPC .. *G05F 1/10* (2013.01); *H02M 3/07* (2013.01)

(58) Field of Classification Search
    USPC .................................................. 327/157, 536
    See application file for complete search history.

(56) References Cited

U.S. PATENT DOCUMENTS

| 4,656,369 A | 4/1987 | Lou |
| 5,003,197 A | 3/1991 | Nojima et al. |
| 5,301,097 A | 4/1994 | Mcdaniel |
| 5,394,372 A | 2/1995 | Tanaka et al. |
| 6,121,821 A | 9/2000 | Miki |
| 6,194,971 B1 * | 2/2001 | Glen et al. ........................ 331/57 |

(Continued)

FOREIGN PATENT DOCUMENTS

| KR | 100132023 B1 | 4/1998 |
| KR | 100586545 B1 | 6/2006 |

(Continued)

OTHER PUBLICATIONS

Instruction Manual for TPS60111 Regulated 5-V 150-mA Low-Noise Charge PUmp DC/DC Converted, Texas Instruments Inc., Jun. 1999-Jun. 2008, Dallas Texas.

(Continued)

*Primary Examiner* — Emily P Pham
(74) *Attorney, Agent, or Firm* — The Mueller Law Office, P.C.

(57) ABSTRACT

A charge pump regulator circuit includes an oscillator and one or more charge pumps. One or more oscillating signals are generated by the oscillator. Each oscillating signal has a frequency or amplitude or both that are variable dependent on a variable drive signal. For some embodiments having multiple oscillating signals, each oscillating signal is phase shifted from a preceding oscillating signal. For some embodiments having multiple charge pumps, each charge pump is connected to receive a corresponding one of the oscillating signals. Each charge pump outputs a voltage and current. For some embodiments having multiple charge pumps, the output of each charge pump is phase shifted from the outputs of other charge pumps. A combination of the currents thus produced is provided at about a voltage level to a load.

18 Claims, 4 Drawing Sheets

(56) References Cited

U.S. PATENT DOCUMENTS

| | | | |
|---|---|---|---|
| 6,294,950 B1* | 9/2001 | Lee et al. | 327/539 |
| 6,304,469 B1 | 10/2001 | Liu | |
| 6,469,569 B1* | 10/2002 | Miyamitsu | 327/536 |
| 6,490,220 B1* | 12/2002 | Merritt et al. | 365/226 |
| 6,597,235 B2* | 7/2003 | Choi | 327/536 |
| 6,657,503 B2* | 12/2003 | Liu | 331/57 |
| 6,693,495 B1* | 2/2004 | Wang | 331/36 C |
| 6,838,928 B2* | 1/2005 | Mihara | 327/536 |
| 7,151,413 B2 | 12/2006 | Lin | |
| 7,167,060 B2 | 1/2007 | Cho et al. | |
| 7,504,877 B1 | 3/2009 | Voogel et al. | |
| 8,111,107 B2 | 2/2012 | Huang | |
| 8,497,670 B1 | 7/2013 | Molin et al. | |
| 2002/0075063 A1 | 6/2002 | Hwang | |
| 2004/0097214 A1* | 5/2004 | Gard et al. | 455/323 |
| 2004/0190361 A1 | 9/2004 | Tokui et al. | |
| 2005/0030771 A1 | 2/2005 | Conte et al. | |
| 2007/0188168 A1* | 8/2007 | Stanley et al. | 324/228 |
| 2008/0054990 A1* | 3/2008 | Shieh et al. | 327/536 |
| 2008/0284496 A1 | 11/2008 | Ha et al. | |
| 2008/0297231 A1 | 12/2008 | Riedel | |
| 2010/0156512 A1 | 6/2010 | Chaoui | |
| 2010/0164531 A1* | 7/2010 | Marshall et al. | 324/766 |
| 2010/0201451 A1* | 8/2010 | Wu | 331/2 |
| 2010/0264981 A1* | 10/2010 | Augustyniak et al. | 327/536 |
| 2011/0037502 A1 | 2/2011 | Nakano et al. | |
| 2011/0148509 A1* | 6/2011 | Pan | 327/536 |
| 2011/0316511 A1* | 12/2011 | Wang et al. | 323/285 |
| 2012/0092054 A1 | 4/2012 | Chang et al. | |
| 2012/0230071 A1 | 9/2012 | Kaneda | |
| 2012/0242401 A1* | 9/2012 | Siragusa et al. | 327/536 |

FOREIGN PATENT DOCUMENTS

| | | |
|---|---|---|
| KR | 100665006 B1 | 1/2007 |
| KR | 20100137838 A | 12/2010 |

OTHER PUBLICATIONS

Notice of Allowance and Fees dated Jun. 4, 2013 for U.S. Appl. No. 13/720,589.

International Search Report and Written Opinion dated Aug. 27, 2013 for PCT Application No. PCT/US2013/040719.

International Search Report and Written Opinion dated Oct. 22, 2013 for PCT Application No. PCT/US2013/049623.

Office Action dated Jun. 4, 2014 for U.S. Appl. No. 13/544,815.

Notice of Allowance and Fees dated Jan. 22, 2015 for U.S. Appl. No. 13/544,815.

* cited by examiner

CHARGE PUMP REGULATOR CIRCUIT WITH VARIABLE AMPLITUDE CONTROL

CROSS-REFERENCE TO RELATED APPLICATIONS

This patent document is a continuation-in-part of patent application Ser. No. 13/544,815 filed Jul. 9, 2012, which is incorporated herein by reference in its entirety.

BACKGROUND OF THE INVENTION

Charge pump regulator circuits may be used to generate an output voltage and current to power a load circuit in an electronic device. There are different types of charge pump regulator circuits, each having different strengths and weaknesses. A common feature of such charge pump regulator circuits is an oscillating signal that is used to generate the output voltage and current. A generally undesirable result of the use of such an oscillating signal is the presence of noise, i.e. ripple or jitter, in the output current and/or voltage of the charge pump regulator circuit, even after passing the output signal through an appropriate filter. Most load circuits, though, can tolerate a certain amount of noise. Nevertheless, various trends in the development of new electronic devices make it a necessity to continually strive for lower and lower levels of noise in such regulator circuits.

A prior art example of a charge pump regulator circuit 100 is shown in FIG. 1. The charge pump regulator circuit 100 generally includes a voltage controlled ring oscillator 101, a high gain buffer 102, a charge pump (a.k.a. voltage multiplier or voltage adder) 103, an RC filter 104 (resistor 105 and capacitor 106), a scaler 107 and an operational amplifier (op-amp) 108. The oscillator 101 generally includes a plurality of inverter stages 109 connected in series output-to-input in a ring. (Some other components or connections are implied, but not shown for simplicity.)

The inverter stages 109 receive a drive voltage (e.g. Vdd) at 110 from the output of the op-amp 108. Under the control of the drive voltage, the signal inverting action of the inverter stages 109 generates an oscillating signal at 111, e.g. the output of one of the inverter stages 109 in the ring. A frequency and amplitude of the oscillating signal at 111 generally depends on a voltage level of the drive voltage.

The oscillating signal at 111 is supplied to an input of the buffer 102. The buffer 102 generates a positive oscillating signal at 112 and a negative oscillating signal at 113. The positive and negative oscillating signals at 112 and 113 generally have the same frequency as the oscillating signal at 111. However, the buffer 102 generally drives an amplitude of the positive and negative oscillating signals at 112 and 113 from rail to rail, i.e. between the same minimum and maximum levels, regardless of the amplitude of the oscillating signal at 111.

The positive and negative oscillating signals at 112 and 113 are supplied to a positive phase input $\Phi$ and a negative phase input $\overline{\Phi}$, respectively, of the charge pump 103. The charge pump 103 generally includes a plurality of series-connected charge pump stages (not shown), which use the positive and negative oscillating signals at 112 and 113 to add voltage to (or subtract from) an initial voltage (not shown) to produce an output current and voltage at 114. The output at 114 of the charge pump 103 is passed through the filter 104 to smooth it out to produce the charge pump regulator circuit output voltage Vout. The output voltage Vout is provided to a load circuit (not shown) of the overall electronic device of which the charge pump regulator circuit 100 is a part.

The output voltage Vout is also provided through the scaler 107 to the op-amp 108 in a feedback loop that controls the current and voltage levels of the output voltage Vout. The scaler 107 produces a scaled voltage at 115 from the output voltage Vout. The scaled voltage is provided to the op-amp 108 along with a reference voltage Vref. The op-amp 108 produces the drive voltage at 110 for the inverter stages 109 based on the scaled voltage at 115 and the reference voltage Vref.

If the scaled voltage at 115 is too large relative to the reference voltage Vref, i.e. the output voltage Vout has increased too much, then the op-amp 108 decreases the drive voltage at 110. When the drive voltage at 110 decreases, the frequency of the oscillating signal at 111 produced by the inverter stages 109 of the oscillator 101 decreases, thereby reducing the frequency of the positive and negative oscillating signals at 112 and 113. When the frequency of the positive and negative oscillating signals at 112 and 113 is reduced, the voltage output at 114 by the charge pump 103 is reduced, thereby reversing the increase in the output voltage Vout. Similarly, if the output voltage Vout decreases too much, then the opposite effect occurs to reverse the decrease. In this manner, the output voltage Vout is generally maintained at about a desired voltage level within an acceptable tolerance or range of ripple or noise.

SUMMARY

A charge pump regulator circuit includes an oscillator and one or more charge pumps. One or more oscillating signals are generated by the oscillator. Each oscillating signal has a frequency or amplitude or both that are variable dependent on a variable drive signal. For some embodiments having multiple oscillating signals, each oscillating signal is phase shifted from a preceding oscillating signal. For some embodiments having multiple charge pumps, each charge pump is connected to receive a corresponding one of the oscillating signals. Each charge pump outputs a voltage and current. For some embodiments having multiple charge pumps, the output of each charge pump is phase shifted from the outputs of other charge pumps. A combination of the currents thus produced is provided at about a voltage level to a load.

A more complete appreciation of the present disclosure and its scope, and the manner in which it achieves the above noted improvements, can be obtained by reference to the following detailed description of presently preferred embodiments taken in connection with the accompanying drawings, which are briefly summarized below, and the appended claims.

DETAILED DESCRIPTION OF THE INVENTION

According to some embodiments, the present invention achieves an improved low noise output voltage (at least under some operating conditions) with a charge pump regulator circuit that has an oscillator and one or more charge pumps. The oscillator may be any appropriate type of device that can produce one or more oscillating signals depending on the needs of the particular embodiments. In some embodiments, the oscillator may be controlled by a variable voltage or variable current and may produce the one or more oscillating signals with a variable frequency, a variable voltage amplitude or a variable current amplitude, or appropriate combination thereof. In some of the embodiments, the oscillator may be a ring type oscillator that has a series of stages arranged in a ring, and the stages may be any appropriate type of stages, such as inverter stages, differential stages, etc. Additionally, the one or more charge pumps may be any appropriate type of device (or types of devices) that can operate in response to the one or more oscillating signals to produce an output voltage and current depending on the particular embodiment.

Figure 2:
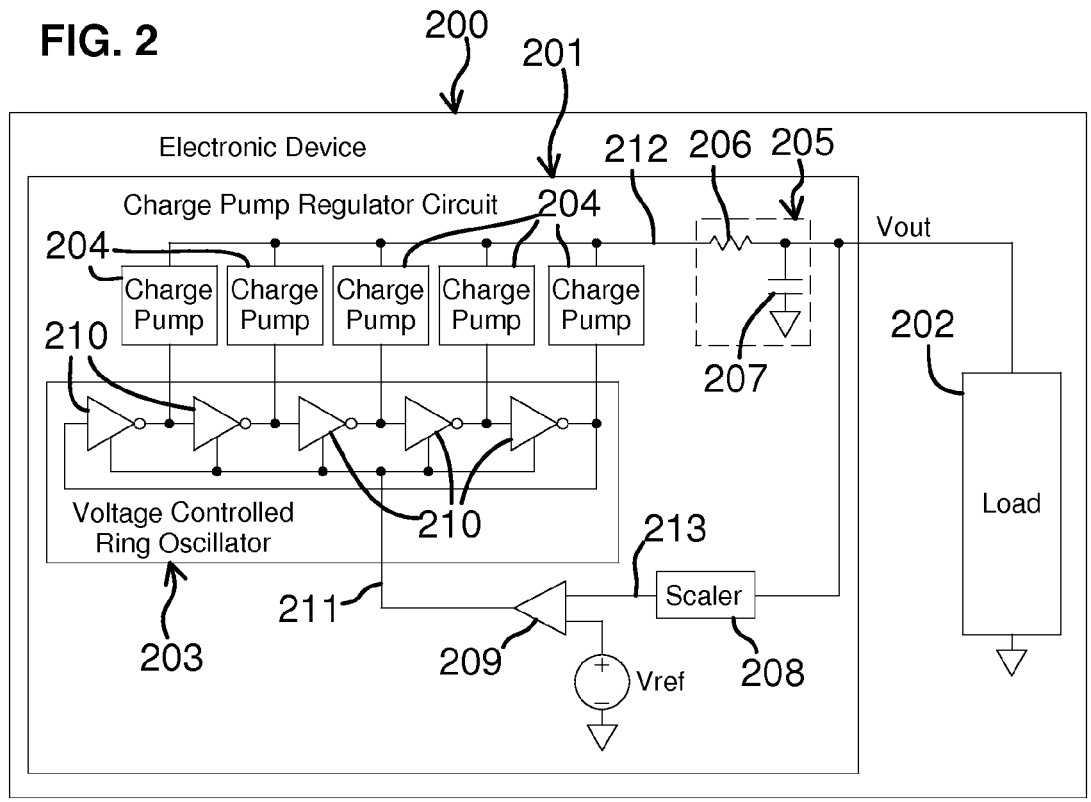
FIG. 2 is a simplified schematic diagram of an electronic device with a charge pump circuit incorporating an embodiment of the present invention.

An electronic device 200 incorporating an embodiment of the present invention is shown in FIG. 2. The electronic device 200 generally includes one or more charge pump regulator circuits 201 that provide power to a load circuit 202. As such, the electronic device 200 may be any appropriate electronic device, such as a computer, a phone, a game console, a clock, an automobile control system or a networking device, among many others.

The charge pump regulator circuit 201 produces power at a generally constant voltage level with a variable current, depending on the activity of the load circuit 202. The design of the charge pump regulator circuit 201 described below generally enables a relatively low level of noise in its output, particularly at lower power production levels, where noise can have a greater negative affect on the load circuit 202 in some situations. For example, in an embodiment in which the electronic device 200 is a cell phone (or other similar device), the received signal strength can be low in power. In this situation the noise coupled to the load circuit 202 from the charge pump regulator circuit 201 can interfere with the received signal, thereby degrading the radio link. Therefore, it is generally desirable to have relatively low noise under such operating conditions. The present invention may also be used in many other situations.

The charge pump regulator circuit 201 generally includes an oscillator 203, one or more charge pumps (a.k.a. voltage multipliers or voltage adders) 204, a filter 205 (e.g. resistor 206 and capacitor 207), a scaler 208 and an op-amp 209. In the illustrated embodiment, the oscillator 203 generally includes a plurality of stages 210 connected output-to-input in series in a ring. Also in the illustrated embodiment, each charge pump 204 corresponds to one of the stages 210. However, it is understood that the present invention is not necessarily limited to having ring type oscillators as shown, but may alternatively have any other appropriate type of oscillator, depending on the particular embodiment. Additionally, for embodiments that have a ring type oscillator, although the oscillator 203 is shown having five stages 210, it is understood that the present invention is not necessarily so limited, but may alternatively have any appropriate or desired number of stages 210. Furthermore, although the illustrated embodiment is shown having five charge pumps 204 or the same number of charge pumps 204 as the number of stages 210, it is understood that the present invention is not necessarily so limited, but may alternatively have any appropriate or desired number of charge pumps 204, e.g. one or more.

Figure 1:
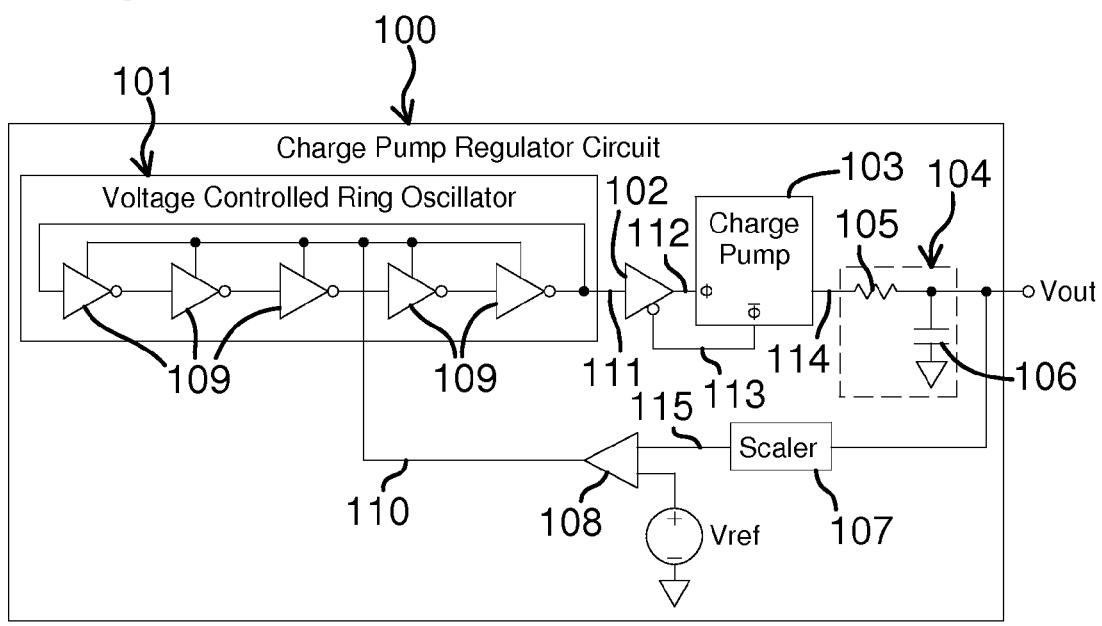
FIG. 1 is a simplified schematic diagram of a prior art charge pump circuit.

The charge pump regulator circuit 201 generally does not require the high gain buffer 102 (FIG. 1) to provide the input to the charge pumps 204. Additionally, in some embodiments, although the charge pump regulator circuit 201 may include more charge pumps 204 than does the prior art circuit 100, and although each charge pump 204 may have a similar geometry to that of the prior art charge pump 103, each charge pump 204 may have a physical size that is scaled down from that of the prior art charge pump 103 by a factor roughly equal to the number of the charge pumps 204. Therefore, the charge pump regulator circuit 201 may have a physical size that is comparable to, or even smaller than, that of the prior art circuit 100. Additionally, the energy used to power the one or more charge pumps 204 may be roughly comparable to that used to power the prior art charge pump 103 at similar power output levels.

In the illustrated embodiment, the stages 210 are shown as simple inverters that output an inverted version of their input signal. However, it is understood that the present invention is not necessarily so limited. Instead, the stages 210 may be any other appropriate type of component, such as differential stages, etc. In some embodiments, the stages 210 may include additional components that produce both an inverted and non-inverted version of their input signal. Additionally, other forms of oscillators (other than ring type) may also be acceptable depending on the embodiment. Furthermore, the oscillator 203 may be voltage controlled or current controlled depending on the embodiment.

Under power from a drive signal (e.g. a drive voltage or drive current) received from the op-amp 209 at 211, the response of the stages 210 is to generate an oscillating signal (or series pulses) that propagates through each stage 210 around in a ring. Each stage 210, thus, produces approximately the same oscillating signal, except that each oscillating signal in the ring is inverted and phase shifted from the preceding oscillating signal. (The phase shifting is described below with respect to FIG. 4.) The phase shift is generally due to a response delay within each stage 210. A frequency and voltage or current amplitude of each oscillating signal and a duration of the delay that produces the phase shift are generally dependent on the level of the drive signal at 211 received from the op-amp 209. The oscillating signals are provided, not only to the next stage 210 in the ring, but also to the one or more charge pumps 204. In some embodiments therefore, each stage 210 corresponds to one of the charge pumps 204.

The charge pumps 204 may be any appropriate circuitry that may add or multiply voltage based on the frequency and voltage or current amplitude of the oscillating signals received from the stages 210. (An example circuit for the charge pumps 204 is described below with respect to FIG. 3. Other types of circuits for the charge pumps 204 are also possible.) In the illustrated embodiment, the charge pumps 204 are generally arranged in parallel, with inputs connected to the outputs of the corresponding stages 210 and outputs connected together to form a combined output at 212.

In the illustrated embodiment, although the connections between the charge pumps 204 and the stages 210 are shown to be made at the outputs of the stages 210, it is understood that the present invention is not necessarily so limited. Instead, the inputs of the one or more charge pumps 204 may be connected to any appropriate locations, nodes or tap points within the oscillator 203. For example, in some embodiments, the stages 210 may have additional internal components (not shown), and the connections to the charge pumps 204 may be made before or after any of these additional internal components. In other words, the oscillator 203 may have considerably more locations, nodes or tap points for connecting to the charge pumps 204 than are shown in the illustrated embodiment. Furthermore, although the charge pump regulator circuit 201 is shown having the same number of charge pumps 204 as stages 210, it is understood that the present invention is not necessarily so limited. Instead, since the oscillator 203 may have more locations, nodes or tap points than the total number of stages 210, the charge pump circuit 201 may also have more charge pumps 204 than the number of stages 210, e.g. some multiple of the number of stages 210. On the other hand, in some embodiments, the charge pump circuit 201 may incorporate fewer charge pumps 204 than the number of stages 210, even just one.

In some embodiments, each of the charge pumps 204 generally produces approximately the same current and voltage based on the frequency and amplitude of the oscillating signals and a relatively constant input voltage (not shown). The output current and voltage of each charge pump 204 contains some noise, ripple or jitter. The noise is at least partially caused by the oscillation of the oscillating signals. Since the multiple charge pumps 204 are each considerably smaller than the single prior art charge pump 103 (FIG. 1), however, the noise produced by each charge pump 204 is considerably smaller than the noise produced by the prior art charge pump 103 when producing a comparable amount of power. Additionally, since the oscillating signals are phase shifted from each other, the outputs of the charge pumps 204 are similarly phase shifted. Consequently, since the level of the noise is typically largest within the same portion of each cycle of the output, and since the outputs are phase shifted from each other, the portions of maximum noise within each output generally do not overlap much, if at all. The already relatively low noise level in the outputs of each individual charge pump 204 is, therefore, generally spread out across the overall combined output of the charge pumps 204. The noise from the output of one charge pump 204, therefore, generally does not exacerbate the noise from the outputs of the other charge pumps 204. For embodiments of the present invention incorporating only one of the charge pumps 204, however, even though the noise from the one charge pump 204 is not spread out as described above, other features of the present invention (e.g. variable frequency and/or variable voltage or current amplitude of the oscillating signals provided by the oscillator 203 to the charge pumps 204) nevertheless generally enable a lower noise level than that of the prior art charge pump 103, at least under some operating conditions.

There are prior art charge pump regulator circuits that incorporate multiple charge pumps in parallel with out-of-phase outputs. However, when such circuits also use a ring oscillator to generate the oscillating signals for the charge pumps, additional circuit components are used to generate the out-of-phase oscillating signals used for each charge pump. The circuit complexity, size and cost are, thereby increased due to the additional circuit components. Embodiments of the present invention, however, generally reduce the complexity of the circuitry that supplies the oscillating signals to the charge pumps 204 (e.g. eliminating the high gain buffer 102 of FIG. 1) and take the unconventional approach of tapping intermediate locations with the ring of stages 210 to generate the phase-shifted oscillating signals without additional circuit components.

In addition to the frequency, the voltage or current amplitude of the one or more oscillating signals that drive the one or more charge pumps 204 is variable, unlike the amplitude of the oscillating signal supplied to the prior art charge pump 103 (FIG. 1) from the high gain buffer 102. In the prior art situation, the high gain buffer 102 generally drives its output voltage rail-to-rail, i.e. between the same maximum and minimum all the time, in order to properly drive the relatively larger prior art charge pump 103. The variability of both the (voltage or current) amplitude and frequency of the one or more oscillating signals for the one or more charge pumps 204, however, generally enables a greater dynamic range for the outputs of the one or more charge pumps 204 than that of the prior art charge pump 103.

Both the amplitude and the frequency of the oscillating signals, however, contribute to the level of noise in the outputs of the one or more charge pumps 204. Therefore, when the amplitude of the one or more oscillating signals for the one or more charge pumps 204 is reduced, the level of noise in the one or more outputs of the one or more charge pumps 204 is also reduced. A reduced amplitude for the one or more oscillating signals generally corresponds with a low power output for the overall charge pump regulator circuit 201. Additionally, the reduced amplitude is generally combined with a reduced frequency, or increased cycle period, for the one or more oscillating signals, which further aids in the reduction of noise at low power output. (The relationship between the amplitude and the frequency/period is described below with respect to FIGS. 5 and 6.) When the power output is increased, the noise level may increase along with the amplitude and frequency of the one or more oscillating signals, but generally remains relatively low compared to that of the prior art charge pump regulator circuit 100 at similar power levels. Additionally, many types of load circuits 202 can tolerate a greater amount of noise during higher power operations than at lower power operations. Therefore, the charge pump regulator circuit 201 may be ideally suited for use in designs that require lower noise at lower power consumption operations, such as, but not limited to, wireless communication receivers, as described above.

The combined output at 212 of the one or more charge pumps 204 is passed through the filter 205 to further smooth out the output voltage Vout of the overall charge pump regulator circuit 201. The output voltage Vout is supplied to the load circuit 202 to power at least some of the functions of the electronic device 200. These functions may vary or be turned on and off at different times, so the load placed on the charge pump regulator circuit 201 may vary. This load variation is generally detected and compensated for by a feedback loop involving the scaler 208 and the op-amp 209.

The scaler 208 receives the output voltage Vout and scales it to a level that the op-amp 209 can handle. The op-amp 209 receives the scaled output voltage at 213 and a reference voltage Vref. Based on the scaled output voltage at 213 and the reference voltage Vref, the op-amp 209 produces the drive signal (e.g. a drive voltage or a drive current) at 211 for the stages 210. Generally, when the load driven by the output voltage Vout increases, the output voltage Vout is pulled down, causing the scaled output voltage at 213 to decrease relative to the reference voltage Vref, which causes the op-amp 209 to increase the drive signal at 211, which causes the stages 210 to increase the frequency and voltage or current amplitude of the oscillating signals, which causes the one or more charge pumps 204 to increase their output, which increases the output voltage and current and brings the output voltage Vout back to the desired level. Conversely, when the load driven by the output voltage Vout decreases, the output voltage Vout increases, causing the scaled output voltage at 213 to increase relative to the reference voltage Vref, which causes the op-amp 209 to decrease the drive signal at 211, which causes the stages 210 to decrease the frequency and voltage or current amplitude of the oscillating signals, which causes the one or more charge pumps 204 to decrease their output, which decreases the output voltage and current and brings the output voltage Vout back to the desired level.

Figure 3:
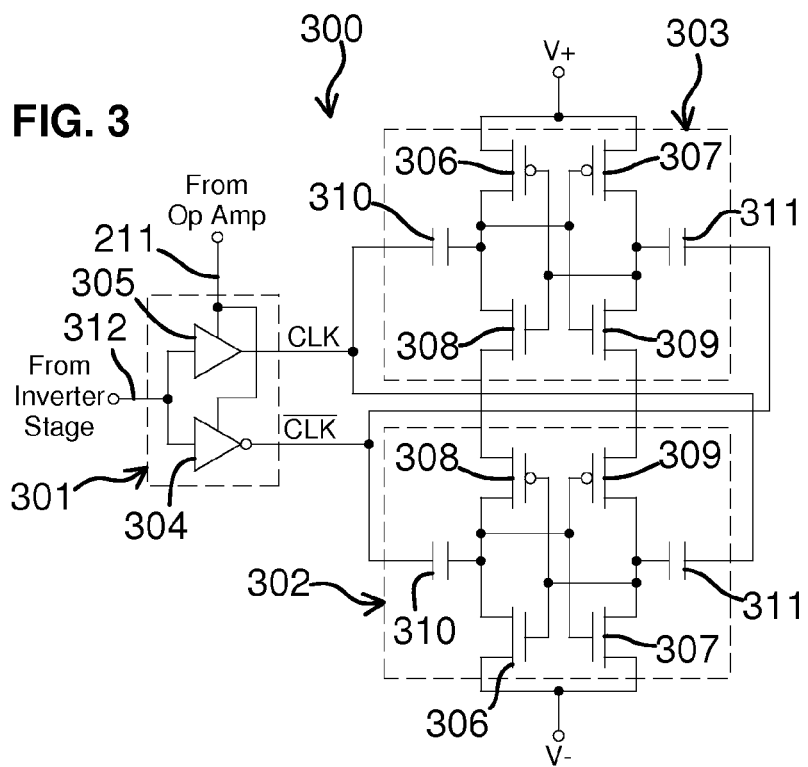
FIG. 3 is a simplified schematic diagram of an example charge pump for use in the charge pump circuit shown in FIG. 2 according to an embodiment of the present invention.

An example charge pump (a.k.a. voltage multiplier or voltage adder) 300 that may be used as the charge pumps 204 is shown in FIG. 3. The charge pump 300 is shown and described for illustrative purposes only. Other types of charge pumps may also be used for the charge pumps 204, so it is understood that the present invention is not limited to this design, except if and where expressly stated.

The example charge pump 300 generally includes an oscillating signal splitter 301 and two charge pump stages (or cells) 302 and 303. The oscillating signal splitter 301 generally includes an inverter 304 and a delay buffer 305. The charge pump stages 302 and 303 generally include transistors 306, 307, 308 and 309 and capacitors 310 and 311.

The oscillating signal splitter 301 generally converts or splits the oscillating signal received from the oscillator 203 (e.g. the corresponding inverter stage 210, FIG. 2) at 312 into a positive oscillating signal CLK and a negative oscillating signal $\overline{CLK}$. The inverter 304 generates the negative oscillating signal $\overline{CLK}$ by inverting the incoming oscillating signal at 312. The delay buffer 305 generates the positive oscillating signal CLK by delaying the incoming oscillating signal at 312 by approximately the same amount as the delay in the inverter 304, so the positive and negative oscillating signals CLK and $\overline{CLK}$ are approximately matched and about 180 degrees out of phase. Depending on the embodiment, though, the positive and negative oscillating signals CLK and $\overline{CLK}$ do not necessarily have to be exact inversions of each other. Additionally, although clock signals are typically considered to be oscillating voltage signals, the present invention is not necessarily so limited. Instead, the charge pump 300 may be of a type designed to operate with a current signal input, so the oscillating signals CLK and $\overline{CLK}$ may be oscillating current signals. Furthermore, the oscillating signal received from the oscillator 203 at 312 may be either a voltage signal or a current signal depending on the design of the oscillator 203, and the oscillating signal splitter 301 (or other appropriate general buffer type device) may convert the oscillating signal between voltage and current type signals as needed by the charge pump stages 302 and 303.

In some embodiments, the inverter 304 and the delay buffer 305 are preferably driven by the same drive signal at 211 (FIG. 2) from the op-amp 209 that drives the stages 210. Additionally, for embodiments in which the stages 210 are inverters, the inverter 304 and the delay buffer 305 preferably have a similar construction as the inverters of the stages 210. As a result, the frequency and amplitude of the oscillating signals produced by the stages 210 are preserved within the positive and negative oscillating signals CLK and $\overline{CLK}$ when they pass through the inverter 304 and the delay buffer 305.

In some alternative embodiments, the oscillator 203 produces the one or more oscillating signals in such a manner that either the frequency or amplitude is variable, but not both. In this case, either the charge pumps 204 or 300 may operate with only one of these parameters being variable, or the oscillating signals may pass through other components (e.g. the inverter 304 and the delay buffer 305) that produce both the frequency and amplitude as variable.

In some alternative embodiments, the oscillator 203 (FIG. 2) produces both the positive and negative oscillating signals CLK and $\overline{CLK}$ and supplies them to the charge pumps 204. In this case, the oscillating signal splitter 301 is not needed within the charge pump 300.

The charge pump stages 302 and 303 are connected in series between a positive voltage node V+ and negative voltage node V−. The charge pump stages 302 and 303 use the positive and negative oscillating signals CLK and $\overline{CLK}$ to step up or step down (i.e. voltage add/subtract or voltage multiply) from an initial input voltage (or ground) to produce the output current and voltage at 212 (FIG. 2) in a conventional manner.

In embodiments in which it is desired for the output voltage to be stepped up from the initial input voltage (or ground), the initial input voltage (or ground) is connected to the negative voltage node V−, and the output at 212 is connected to the positive voltage node V+. Each charge pump stage 302 and 302 then steps up the voltage from the initial input voltage (or ground) at the negative voltage node V− by an amount based on the frequency and amplitude of the positive and negative oscillating signals CLK and $\overline{CLK}$ to produce the output voltage at the positive voltage node V+.

On the other hand, in embodiments in which it is desired for the output voltage to be stepped down from the initial input voltage (or ground), the initial input voltage (or ground) is connected to the positive voltage node V+, and the output at 212 is connected to the negative voltage node V−. Each charge pump stage 302 and 302 then steps down the voltage from the initial input voltage (or ground) at the positive voltage node V+ by an amount based on the frequency and amplitude of the positive and negative oscillating signals CLK and $\overline{CLK}$ to produce the output voltage at the negative voltage node V−. (The charge pump 300, thus, sources or sinks current depending on whether the output voltage is positive or negative.)

Although the charge pump 300 is shown having two charge pump stages 302 and 303, it is understood that the present invention is not necessarily so limited. Instead, any number of charge pump stages may be used, generally depending on the level of the initial input voltage, the amount that each charge pump stage steps up/down the voltage and the desired level for the output voltage.

Additionally, although the charge pump 300 is shown operating based on the positive and negative oscillating signals CLK and $\overline{CLK}$, it is understood that the present invention is not necessarily so limited. Instead, other types of charge pumps may be used, including those that operate with a single oscillating signal.

Figure 4:
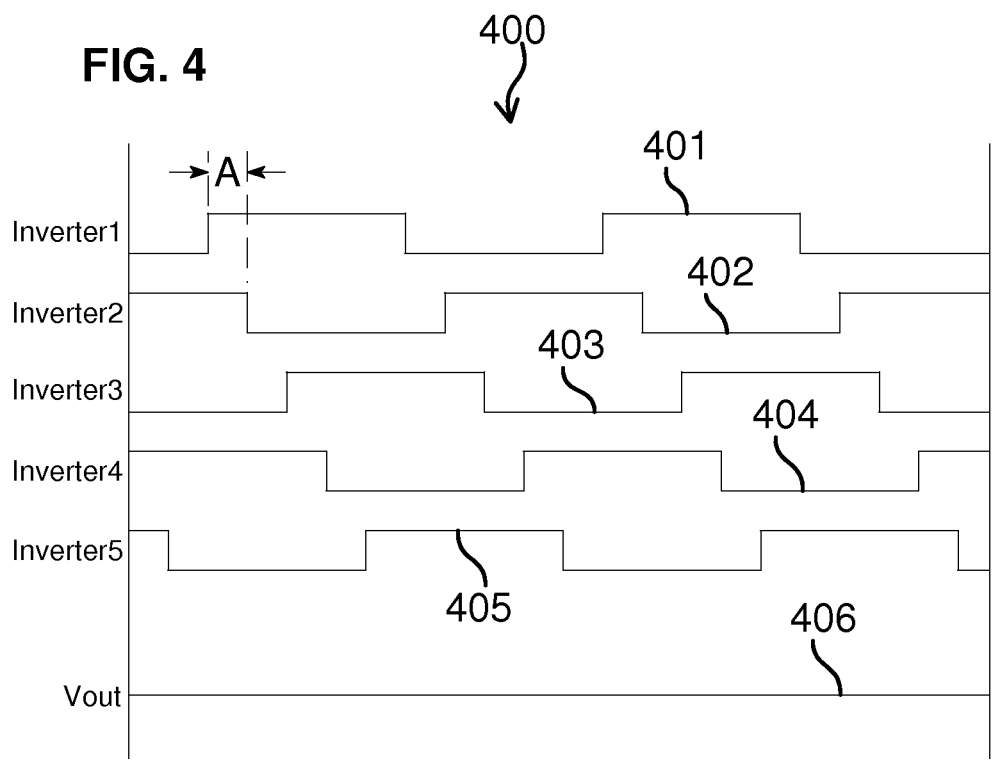
FIG. 4 shows simplified example timing diagrams illustrating the performance of example inverter stages and an output of the charge pump circuit shown in FIG. 2 according to an embodiment of the present invention.

For an embodiment having more than one oscillating signal produced by the oscillator 203 (FIG. 2) and more than one charge pump 204, a timing diagram 400 illustrating an example relationship between the oscillating signals (401-405) produced by the stages 210 is shown in FIG. 4 along with an example output voltage Vout. Each oscillating signal 401-405 for each stage 210 is shown inverted and phase shifted by an amount A from the one that precedes it. (The first oscillating signal 401 is likewise inverted and phase shifted from the last oscillating signal 405.) The outputs of each charge pump 204 are similarly phase shifted, so that the combined output voltage Vout (graph 406) has relatively little noise. Additionally, although the diagram 400 shows the oscillating signals 401-405 as square waves with a constant maximum amplitude, it is understood that the present invention is not necessarily so limited. Instead, the oscillating signals 401-405 may have any appropriate shape (e.g. square, saw tooth, etc.) and a variable amplitude depending on the embodiment.

Figure 5:
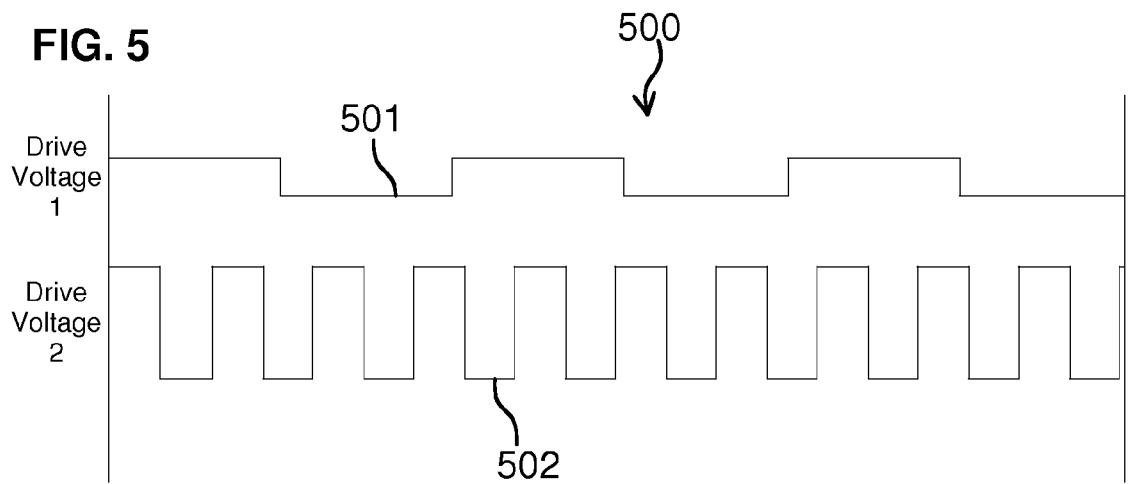
FIG. 5 shows simplified example timing diagrams illustrating the performance of an example inverter stage for use in the charge pump circuit shown in FIG. 2 according to an embodiment of the present invention.
Figure 6:
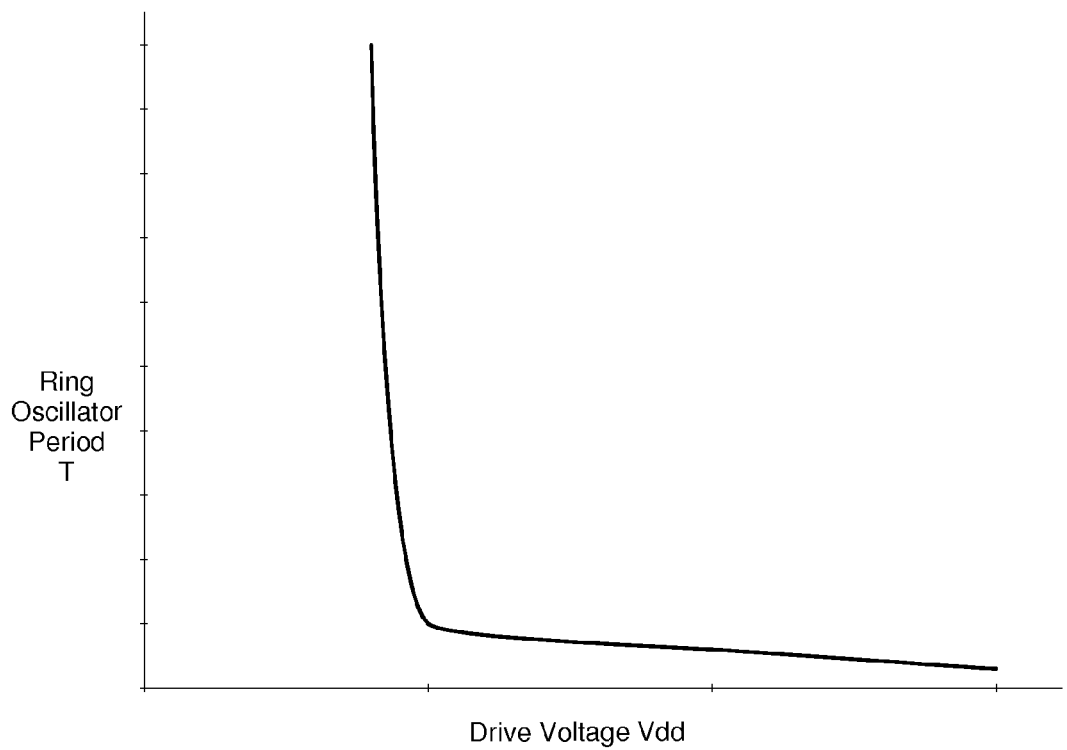
FIG. 6 is a simplified period vs. drive voltage graph illustrating the performance of an example voltage controlled ring oscillator for use in the charge pump circuit shown in FIG. 2 according to an embodiment of the present invention.

An additional timing diagram 500 illustrating the dependence of the one or more oscillating signals on the drive voltage at 211 (FIG. 2) is shown in FIG. 5. Similarly, a ring oscillator period T vs. drive voltage Vdd response curve 600 for the stages 210 is shown in FIG. 6. When the drive voltage at 211 is relatively low (graph 501, and left end of curve 600), the amplitude of the oscillating signals is relatively small and the frequency is relatively low (i.e. the period is relatively large). On the other hand, when the drive voltage at 211 is relatively high (graph 502, and right end of curve 600), the amplitude of the oscillating signals is relatively large and the frequency is relatively high (i.e. the period is relatively small). As discussed above, embodiments of the present invention take advantage of this relationship to enhance the dynamic range of the charge pump regulator circuit 201.

Although embodiments of the present invention have been discussed primarily with respect to specific embodiments thereof, other variations are possible. Various configurations of the described system may be used in place of, or in addition to, the configurations presented herein. For example, additional components may be included in circuits where appropriate. As another example, configurations were described with general reference to certain types and combinations of circuit components, but other types and/or combinations of circuit components could be used in addition to or in the place of those described.

Those skilled in the art will appreciate that the foregoing description is by way of example only, and is not intended to limit the present invention. Nothing in the disclosure should indicate that the present invention is limited to systems that have the specific type of charge pumps shown and described. Nothing in the disclosure should indicate that the present invention is limited to systems that require a particular form of semiconductor processing or integrated circuits. In general, any diagrams presented are only intended to indicate one possible configuration, and many variations are possible. Those skilled in the art will also appreciate that methods and systems consistent with the present invention are suitable for use in a wide range of applications.

While the specification has been described in detail with respect to specific embodiments of the present invention, it will be appreciated that those skilled in the art, upon attaining an understanding of the foregoing, may readily conceive of alterations to, variations of, and equivalents to these embodiments. These and other modifications and variations to the present invention may be practiced by those skilled in the art, without departing from the spirit and scope of the present invention, which is more particularly set forth in the appended claims.

What is claimed is:

1. A charge pump regulator circuit that powers a variable load, the circuit comprising:
   an oscillator producing an oscillating signal that has an amplitude and a frequency that are both variable depending on an amplitude of a variable drive signal; and
   a charge pump connected to receive the oscillating signal, the charge pump outputting a current at about a voltage level to the variable load;
   wherein the oscillator produces more than one version of the oscillating signal from multiple nodes within the oscillator.

2. The charge pump regulator circuit of claim 1, wherein the output of the charge pump is dependent on the variable amplitude of the oscillating signal.

3. The charge pump regulator circuit of claim 1, wherein the oscillating signal also has a frequency that is variable depending on the variable drive signal.

4. The charge pump regulator circuit of claim 1, wherein the variable amplitude of the oscillating signal is a variable voltage amplitude.

5. The charge pump regulator circuit of claim 1, wherein the variable amplitude of the oscillating signal is a variable current amplitude.

6. The charge pump regulator circuit of claim 1, wherein:
   the oscillator is a voltage controlled oscillator; and
   the variable drive signal is a variable drive voltage.

7. The charge pump regulator circuit of claim 1, wherein:
   the oscillator is a current controlled oscillator; and
   the variable drive signal is a variable drive current.

8. The charge pump regulator circuit of claim 1, wherein the oscillator has a plurality of stages connected in series in a ring and produces one or more oscillating signals from each stage for one or more charge pumps corresponding to each stage.

9. The charge pump regulator circuit of claim 1, wherein:
   the nodes are arranged in a ring; and
   each oscillating signal is phase shifted from a previous oscillating signal.

10. The charge pump regulator circuit of claim 1, wherein the oscillator has a plurality of stages connected in series in a ring and produces the oscillating signal from one of the plurality of stages for the charge pump.

11. A charge pump regulator circuit that powers a variable load, the circuit comprising:
    an oscillator producing a plurality of oscillating signals from a plurality of stages, each oscillating signal being an input to a corresponding one of the plurality of stages and having a frequency and an amplitude that are both variable depending on an amplitude of a variable drive signal applied to the plurality of stages; and
    a plurality of charge pumps connected to receive the plurality of oscillating signals, the charge pumps outputting a current at about a voltage level to the load.

12. A charge pump regulator circuit that powers a variable load, the circuit comprising:
    an oscillator producing a first oscillating signal that has a constant amplitude;
    a buffer connected to receive the first oscillating signal, the buffer producing a second oscillating signal that has a variable amplitude and a variable frequency that are both dependent on an amplitude of a variable drive signal; and
    a charge pump connected to receive the second oscillating signal, the charge pump outputting a current at about a voltage level to the load.

13. A method comprising:
    generating an oscillating signal by an oscillator;
    varying an amplitude and a frequency of the oscillating signal depending on an amplitude of a variable drive signal;
    providing the oscillating signal as an input to a charge pump;
    generating a charge pump output current; and
    providing the charge pump output current at a voltage level to a load; and
    further comprising generating more than one version of the oscillating signal from multiple nodes within the oscillator.

14. The method of claim 13,
    wherein the oscillator has a plurality of stages connected in series in a ring; and
    further comprises generating the oscillating signal from one of the plurality of stages in the oscillator.

15. The method of claim 13, wherein the generating of the charge pump output current is dependent on the varying of the amplitude of the oscillating signal.

16. The method of claim 13, further comprising varying a frequency of the oscillating signal depending on the variable drive signal.

17. The method of claim 13, wherein:
the oscillator has a plurality of stages connected in series in a ring;
each stage can generate one or more versions of the oscillating signal; and
the method further comprises:
generating a plurality of versions of the oscillating signal by generating the one or more versions of the oscillating signal from each one of the plurality of stages;
varying the amplitude of the plurality of versions of the oscillating signal depending on the variable drive signal;
providing the plurality of versions of the oscillating signal as inputs to a plurality of versions of the charge pump;
generating a plurality of versions of the charge pump output current; and
providing a combination of the plurality of versions of the charge pump output current at the voltage level to the load.

18. The method of claim 13, wherein:
the multiple nodes are arranged in a ring; and
each oscillating signal is phase shifted from a previous oscillating signal.

* * * * *